(12) United States Patent
Campbell et al.

(10) Patent No.: US 6,635,149 B1
(45) Date of Patent: Oct. 21, 2003

(54) WATER PURIFICATION SYSTEM

(76) Inventors: Norman Campbell, 49 Hickory La., Shelton, CT (US) 06484; Norman E. Bersing, 330 Shore Rd., Old Lyme, CT (US) 06371; Ronald E. Larsen, 537 Rte. 80, Deep River, CT (US) 06417

( * ) Notice: Subject to any disclaimer, the term of this patent is extended or adjusted under 35 U.S.C. 154(b) by 0 days.

(21) Appl. No.: 09/697,018

(22) Filed: Oct. 26, 2000

(51) Int. Cl.⁷ .............................. B01D 3/42; B01D 1/00; C02F 1/04
(52) U.S. Cl. .................. 202/160; 159/44; 159/DIG. 1; 202/206; 202/266; 203/1; 203/2; 203/10; 203/100; 204/279; 219/383; 392/303; 392/331
(58) Field of Search ................. 203/10, 1, 100, 203/2, DIG. 18; 219/383; 204/279; 202/176, 206, 185.2, 182, 234, 266, 160; 159/DIG. 1, DIG. 26, 44; 392/338, 303, 331

(56) References Cited

U.S. PATENT DOCUMENTS

| | | | |
|---|---|---|---|
| 3,854,032 A | * 12/1974 | Cooper | .................. 219/383 |
| 3,933,600 A | * 1/1976 | Dodge et al. | ................. 203/10 |
| 4,045,293 A | 8/1977 | Cooksley | |
| 4,617,093 A | 10/1986 | Hwang | |
| 4,767,527 A | * 8/1988 | Iniotakis et al. | ............. 210/137 |
| 4,846,935 A | 7/1989 | Giesselmann et al. | |
| 5,142,873 A | 9/1992 | Ramsey | |
| 5,188,742 A | 2/1993 | Shurtleff | |
| 5,451,318 A | 9/1995 | Moorehead | |
| 5,549,078 A | 8/1996 | Annecharico et al. | |
| 5,582,632 A | 12/1996 | Nohr et al. | |
| 5,810,977 A | 9/1998 | Annecharico et al. | |
| 6,252,225 B1 | * 6/2001 | Takada et al. | ............... 250/288 |

* cited by examiner

Primary Examiner—Virginia Manoharan
(74) Attorney, Agent, or Firm—Handal & Morofsky

(57) ABSTRACT

A water purification system and method for residential or commercial application having a first support structure coupled to a water supply having a first heat source of sufficient magnitude to change the water into steam, thus abandoning any insoluble material dispersed within the liquid. The steam is further heated in a second support structure to form a substantially gaseous vapor and exposed to a second heat source of sufficient magnitude to super-heat the vapor to a temperature capable of destroying most, if not all living matter. Preferably, the second heat source is an electrical field of sufficient voltage to increase the temperature of the vapor in excess of 2000° F. The super-heated vapor is then allowed to condense to form potable water. This system may be powered by a standard 120 volt outlet found in the home.

16 Claims, 3 Drawing Sheets

WATER PURIFICATION SYSTEM

TECHNICAL FIELD

The present invention is directed to a system and method for purifying water. In particular, the invention is directed to a system and method for removing contaminants, such as volatile organic compounds and inorganic compounds like metals, from water through the use of a system and method for heating the water to form vapor and then super heating the vapor to remove contaminants.

REFERENCE TO GOVERNMENT FUNDING

Not Applicable.

BACKGROUND OF THE INVENTION

Many homes, businesses and communities rely on underground water for their fresh water supply. By drilling wells to various depths this underground water which is contained in underground aquifers is tapped and used. This is generally a pure water source, although it may have a relatively high mineral content. That is, the water may be what is commonly termed "hard water".

High mineral content, although bothersome, does not make a water unuseable. However, if water contains measurable levels of organic materials, it can for health reasons, be considered unuseable for human consumption. These organic contaminants are the result of past abuses of the environment, many of them now illegal, that have come to us with our modern way of life. Thus contamination of ground water by volatile and semi-volatile organic compounds has become a widespread and well documented problem.

For example, organic chemicals have been disposed of by depositing them in landfills or by letting them seep into the ground and air from waste lagoons. Such contaminants enter the ground water from various sources such as underground storage tanks, municipal and industrial landfills, and industrial effluents. Contaminants may also enter the water as unintended by-product of conventional chemical treatment processes utilized to disinfect water on its way to municipal water supplies. Gasoline has entered the ground water from corroded underground storage tanks. A corroded tank can leak five or more gallons per day into the ground. This leakage is usually not discovered until hundreds of gallons have leaked into the ground. The result of ground water contamination is that wells which once yielded pure water now only produce contaminated water. Aquifers have been polluted with amounts of organics which make the water under a large area unuseable. However, in many cases the pollution only affects a small area. As the concentration of contaminants in ground water approach or exceed "acceptable levels", the contaminants must be removed to render the water potable. Hence, as the water supply used by a municipality and/or private well owner approaches the "acceptable level" for a contaminant, the municipality and/or private well owner must either accept the risk associated with such levels of contaminant, locate an alternative water source, or implement a treatment processes for removing the contaminant. Generally, treatment processes for removing contaminants from water are extremely expensive. The most common method of removing contaminants from water is to contact the water with granular activated carbon. Treatment with activated carbon is generally the treatment of choice because it can readily remove a wide variety of typical contaminants. However, while activated carbon is effective at removing the less volatile contaminants such as PCBs, PAHs, and phenolics it is not particularly effective at removing the more volatile contaminants such as chloroform, 1,1,2-trichloroethane and trichloroethylene because of its low affinity for such contaminants. Hence, effective use of activated carbon to treat water contaminated with a volatile contaminant requires frequent replacement of the activated carbon to maintain optimum affinity of the activated carbon for the contaminant. Such frequent replacement of the activated carbon can significantly increases the cost of an already expensive process. A second commonly employed method of removing contaminants from water is to pass the water through an air stripping tower. Basically, an air stripping tower removes contaminants from water by cascading the water over a packing material designed to uniformly disperse the water throughout the tower while providing an upward flow of air which is also designed to uniformly disperse the water throughout the tower as well as provide a supply of air into which the contaminants may dissipate. However, effective operation of air stripping towers is difficult as they are readily susceptible to flow channeling and flooding. Air stripping is the treatment method of choice for removing volatile contaminants from water because of its relatively low cost. However, in order to prevent contamination of the atmosphere with the stripped contaminants it is typically necessary to recover the contaminant from the air prior to its release into the atmosphere and such secondary recovery can significantly increase the cost of the treatment. In addition, air stripping is not particularly effective at removing semivolatile and non-volatile contaminants as such contaminants are not readily volatilized from the water into the air. In the industrial arts, it is known to use an activated carbon filter in combination with a radiation source to filter and purify water. For example, such systems are used in the production of bottled water. The adaptation of this technology to home use has been difficult. Industrial systems are large, expensive and require special knowledge and tools to maintain. The expense of these systems is often due to the fact that they are designed to process water volumes many times larger than those required for home use. Other challenges encountered when designing such a water treatment system for home use stem from the varying operating conditions in each home. For example, water quality, water line pressure, water demand and the sophistication of the user will vary in different homes. Some water purifiers intended for home use are known which combine activated carbon filters with an ultraviolet (UV) radiation source. However, the performance of most known ultraviolet discharge bulb designs degrades with time. It is therefore desirable to monitor the radiant energy source and alert the user if there is a malfunction. In this regard, these home units have had a limited success due to inherent problems with their design that make maintenance of the units by the homeowner difficult and inconvenient. This can result in a water purification unit that, in time, operates only marginally if at all.

Another type of pollution that poses significant health risks is microbiological activity. Like volatile organic pollution, the effects of microbiological activity in water is far more serious than the problems of hard water. Where the water purification unit is being used with a source of drinking water that contains contaminants or microbiological activity, the lack of maintenance of an activated carbon filter can have serious consequences. Thus one important factor is the kill rate of microorganisms, which may vary dependent on the performance of the carbon filter. Such filters are commonly used to remove contaminants from the water prior to irradiation. Moreover, the effectiveness of radiation in the killing of microorganisms is dependent on the clarity of the water. If any significant particulate contamination defeats the carbon filter, such contamination can mask or protect the microorganisms from the killing radiation. The drawbacks associated with the processes commonly employed to remove contaminants from water has resulted in a continued need for an inexpensive alternative technique for achieving the effective removal of contaminants, particularly volatile contaminants, from groundwater. In some circumstances, supplying bottled water may be an option. However, it is often costly, or impossible depending on the intended location. Furthermore, bottled water is not a viable solution for all situations, such as for general usage in the home.

It is therefore desirable to provide some water purification technique which is simple and economical, and which preferably does not require any large, complex or expensive equipment. It is desirable that the method can be carried out in a simple and economic apparatus, so that it becomes feasible to supply such equipment or apparatus to any location where potable water is needed.

SUMMARY OF THE INVENTION

The present invention is directed primarily to cleaning water for end use, both residential and commercial, but may also be used for large scale operations, such as the remediation of polluted water from a disaster.

The present invention purifies the water by exposing it to a first heat source to cause the water to change from liquid to a substantially gaseous vapor, thus abandoning any insoluble matter that may have been interspersed in the liquid. The vapor is then super-heated by a second heat source of sufficient magnitude to increase the vapor temperature to a level at which most, if not all remaining contaminants are destroyed. The super-heated vapor condenses to form potable water.

The first heating of the water to vapor may be accomplished by an apparatus that includes a flash-heating device that raises the water temperature above its boiling point almost instantaneously upon entry, thus avoiding any foaming problems that typically lower the efficiency in conventional water boiling tanks. As the water immediately evaporates in the flash-heating device, it forms steam and leaves the insoluble matter behind. The steam is further heated to form a substantially gaseous vapor before being super heated.

While the vapor is in a substantially gaseous form, preferably at a temperature in the range of 212–600° F., it is super-heated by a second heat source to a temperature which is preferably in the range of 1500–3000° F. This second heat source may be an electrical field of sufficient magnitude. The voltage required for this utility may originate from a power supply, which may be powered by a standard household outlet. Preferably, the electrical field is generated in a chamber having a shape or configuration most conducive to causing ample contact between the vapor and electrical field.

After contact with the electrical field, the super-heated vapor is allowed to condense, forming potable water, and collected for use. Preferably, the present invention is operated at a pressure less than 10 psi.

BRIEF DESCRIPTION OF THE DRAWINGS

The advantages of the system and apparatus of the present invention will be understood from the following description taken together with the drawings, in which.

DETAILED DESCRIPTION OF THE INVENTION

Figure 1:
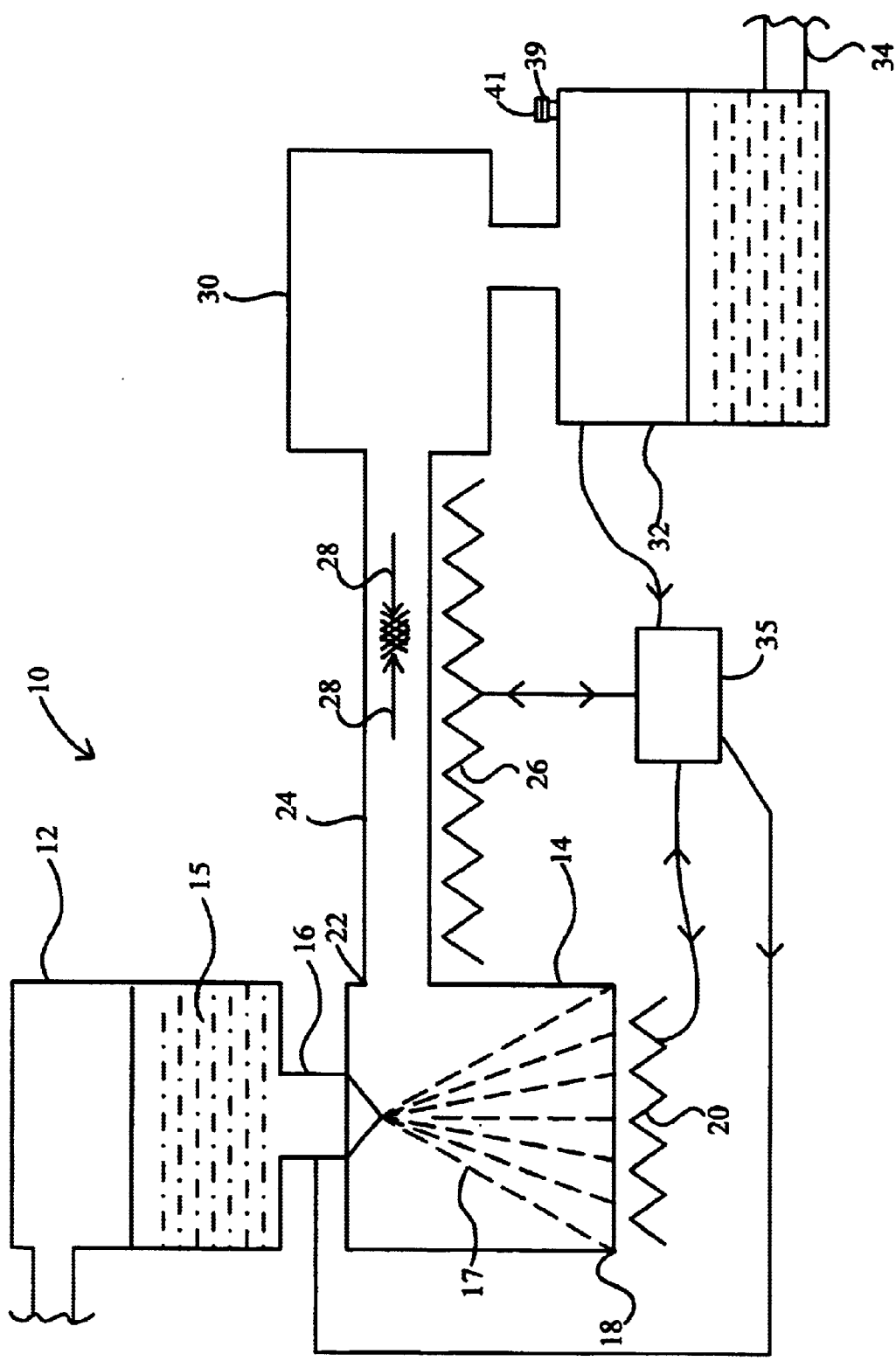
FIG. 1 is a schematic diagram of a first embodiment of the present invention.

FIG. 1 illustrates the inventive water purification system 10, exemplified by a first embodiment of the present invention. Raw water from a groundwater well, municipal system, aquifer or the like, is contained in a holding tank 12 prior to entry into a scorching chamber 14. Preferably, water 15 is released from holding tank 12 into scorching chamber 14 in batches of approximately equal amounts. In this embodiment, water enters scorching chamber 14 via pulse water injection device 16, which may be an aerosol device. Pulse injection device 16 outputs an aerosol mist 17.

Chamber 14 includes heating plate 18, which is maintained at a temperature of high enough to quickly bring the water temperature above its boiling point, thus flash-heating the water and almost immediately causing the water to change from liquid to steam upon contact. Generally, heating plate 18 must be large enough and hot enough that, with water put through the system 10 at the desired rate, the water hitting heating plate 18 will not ever cool to a temperature below the boiling point of water. As an added feature, a temperature sensor may be used to stop the throughput of water if the heating element becomes too cool, for example, less than 400° F.

In this embodiment, heating plate 18 is heated by a heating element 20. Preferably, heating plate 18 is maintained at a temperature range between 300° F. and 500° F. Pulse injector device 16 may be set to disperse water over substantially all of the area of heating plate 18. Alternatively, a device for maintaining water discharge into chamber 14 at a controlled constant state, or any other valve or device that sprays water 15 into chamber 14, such as a pump, stream head, sprinkler head or spray head, may also be used. Also, water 15 may discharge through a valve into chamber 14 via pressure from the source or a pressurized tank.

Raw water, after it has been put into gaseous form leaves behind particulate matter such as metals and other water-insoluble compounds that may have been contained in the raw water while in liquid form. These contaminants remain in scorching chamber 14 while steam flows through outlet 22, as shown.

Outlet 22 is located at a higher vertical elevation in chamber 14 than the vertical positions of water input into the system when water is introduced into scorching chamber 14 prior to the evaporation of the water. This prevents water in liquid form from exiting chamber 14 through outlet 22. Since injector 16 is adjustable, and may be set to release water in batch amounts that instantaneously vaporize upon contact with heating plate 18, the rate of water being added to scorching chamber 14 may be set at a rate that will provide a constant flow of steam through outlet 22 without overflowing chamber 14.

Once through outlet 22, the steam flows through chamber 24, where it is further heated by heating element 26. Preferably, and as shown by this embodiment, chamber 24 is cylindrical. The steam is heated by heating element 26 to a temperature ranging from 212° F. to 700° F. to ensure complete vaporization of any droplets that may have been carried by the steam flow. Preferably, the vapor is heated to a temperature greater than 400° F. All known living matter is destroyed at these temperatures.

The following table illustrates the temperatures at which various compounds are incinerated, being broken down into carbon dioxide, water and other harmless materials.

TABLE 1

Combustion Temperatures of Various Compounds

| Compound | Auto Ignition Temperature (° F.) |
| --- | --- |
| Ammonia (Anhydrous) (Gas) | 1204 |
| Amyl Acetate | 714 |
| Amyl Alcohol | 572 |
| Aniline | 1418 |
| Asphalt | 905 |
| Butanol (Butyl Alcohol) | 689 |
| Carbolic Acid (Phenol) | 1319 |
| Carbonic Acid | 1319 |
| Castor Oil | 840 |
| Creosote | 637 |
| Diethylene Glycol | 444 |
| Diphenyl 300 F–350 F | 1004 |
| Ether | 356 |
| Ethyl Chloride (No Water) | 966 |
| Ethylene Glycol | 775 |
| Formaldehyde | 806 |
| Formic Acid | 1114 |
| Gasoline-Refined | 495 |
| Glycerine (Glycerol) | 739 |
| Hydrocyanic Acid (No Air) | 100 |
| Isopropanol (Isopropyl Alcohol) | 750 |
| Kerosene | 444 |
| Linseed Oil | 650 |
| Methyl Alcohol (Methanol) | 867 |
| Methyl Bromide | 998 |
| Methyl Chloride | 1170 |
| Methylene Chloride | 1224 |
| Naptha | 900/950 |
| Napthalene | 979 |
| Nitrobenzene | 900 |
| Oleic Acid | 685 |
| Picric Acid | 572 |
| Stearic Acid | 743 |
| Sulfur | 450 |
| Sulfur Chloride | 453 |
| Tannic Acid | 980 |
| Tartaric Acid | 802 |
| Toluene | 947 |
| Triethylene Glycol | 700 |
| Turpentine Oil | 488 |

As can be understood from the above, the instant invention will thus result in killing living organisms, endotoxins and pyrogens, due to the high heat, and will also cause hydrocarbons, such as those commonly found in water pollution, to break down into such compounds has water, carbon, carbon dioxide and other harmless materials.

While flowing through chamber 24, the gaseous vapor is exposed to a highly charged electrical field generated between electrodes 28. The electrical field is of sufficient magnitude to elevate the temperature of the vapor at least beyond 1500° F. The voltage may range from 5000 to 12,000 volts depending on the configuration. Preferably, the voltage is sufficient to elevate the vapor temperature in excess of 2000° F. The chamber having the electrical field, which in this embodiment is chamber 24, is to be made of inert material which, among other properties, is electrically non-conductive and will not release pollutants into the vapor when heated. The super-heated vapor is then discharged into condenser 30, which may comprise any conventional condenser arrangement. Preferably, heating element 26 extends along chamber 24 to maintain the super-heated vapor at a temperature sufficient to keep it as a vapor, until entering condenser 30. Purified water from condenser 30 drains to collection tank 32, which has an outlet 34 for supplying potable water.

Preferably, system 10 further comprises an air emissions pollution control device. In this embodiment, collection tank 32 has a pressure-release valve 39 with charcoal gas trap filter 41.

Preferably, the present invention further comprises a main control system 35, which may be microprocessor or personal computer based, for automatically running the system based on peak periods of usage and controlling and adjusting parameters, such as operating times, temperatures, water flow rate, etc. As illustrated in FIG. 1, the control system may control the input of water through nozzle 16 in response to such factors as a temperature of heating element 20, the level of water in holding tank 32, and the temperature in the electrical field between electrodes 28.

Figure 2:
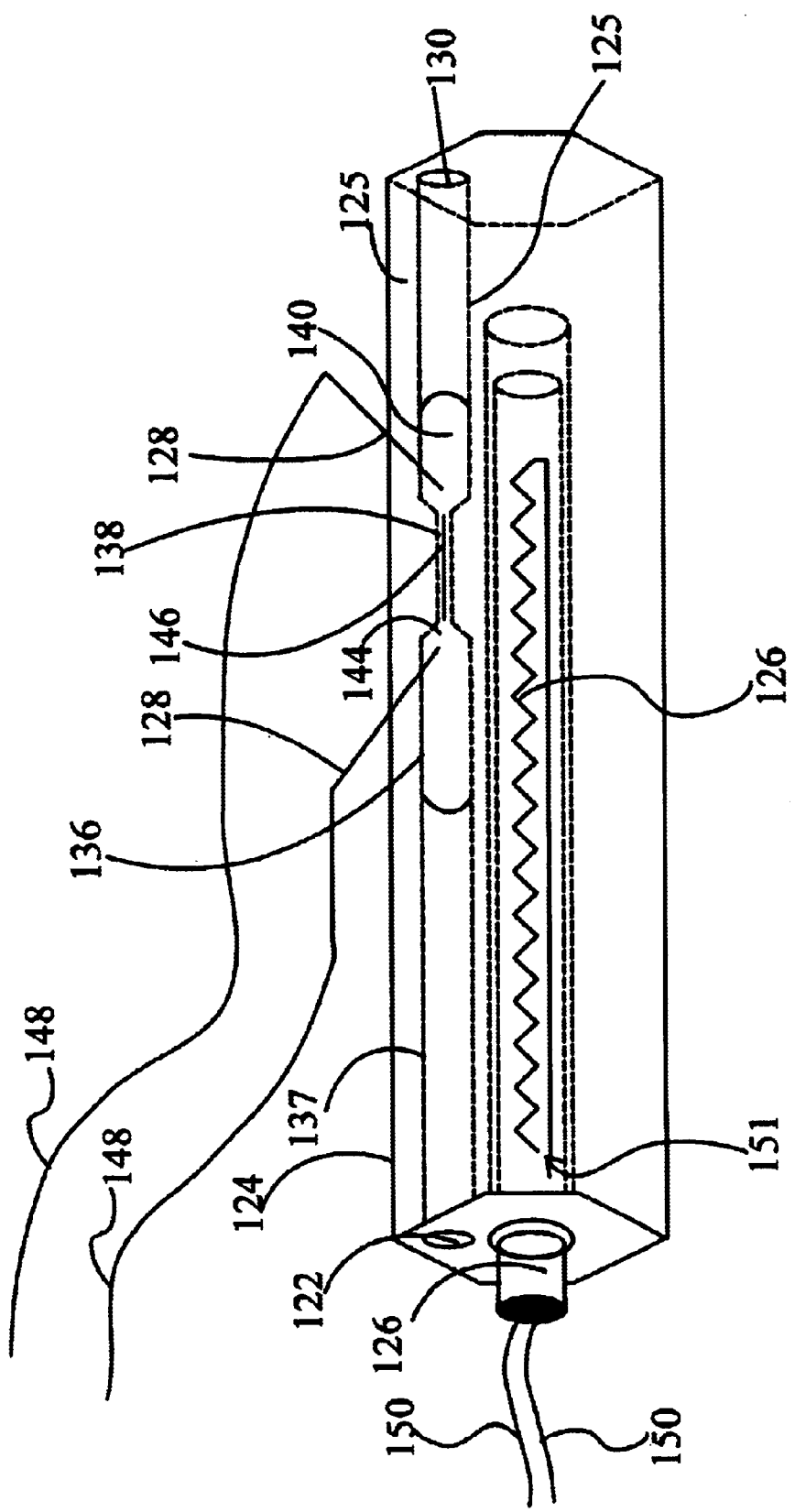
FIG. 2 illustrates an embodiment of a device implementing the corona field in accordance with the present invention.

FIG. 2 illustrates an embodiment of a device which produces a highly charged electrical field of the type known as a "corona field" in accordance with the present invention. In this embodiment, the interior of chamber 124 is defined within a lava rock block 125, of the type which is inert, machinable and can withstand high temperatures. Preferably, the electrical field is generated in a chamber shaped or configured in a manner that results in the most substantial vapor contact with the field, particularly at its anodes. In this embodiment, chamber 124 comprises tube 137. Tube 137 further comprises a first tube portion 136 having a first diameter, a second tube portion 138 having a second diameter and a third tube portion 140 having substantially the same diameter as the first tube portion 136. Conical portions 144 have diameters at their ends which match either the diameters of the first and second, or second and third tube portions, respectively, to provide a connection between tube portions 136, 138 and 140. The ratio of the diameter and length of tube portion 138 is determined by the electrical energy and focus of anodes 128.

Vapor flow enters chamber 124 at inlet 122 as steam and is heated by heater rod 126 to a temperature that changes the steam to gaseous vapor in first tube portion 136 of tube 137. After funneling through conical portion 144, the gaseous vapor is exposed to corona field 146 within second tube portion 138. Corona field 146 is generated by anodes 128 which extend into tube portions 136 and 140 at the entrance and exit of second tube portion 138. After exiting tube portion 138 through a second conical portion 144, the super-heated vapor flows into tube portion 140 and exits chamber 124 via outlet 130. Heating element 126 comprises a nichrome heater rod, such as that which is marketed by Chromolox, Inc., although chamber 124 may be heated by any conventional means. Heating element 126 is contained within a hole 151 within lava rock block 125, and closely fits within hole 151. Alternately, the inert material may be configured to fit a heating element 126 which may be of the type that encompasses tube 137 like a sleeve, or wraps around tube 137, such as a heating element having a helical or concentric circular shape. Power leads 148 and 150 supply anodes 128 and heating element 126 with electricity. Preferably, the present invention is capable of being fully powered by plugging it into a standard household outlet. Corona field 146, which may be upwards of 9000 volts, can derive this voltage from a high voltage solid state circuit. Power for heating element 126, as well as any other device included in the present invention can be derived from the AC mains.

Figure 3:
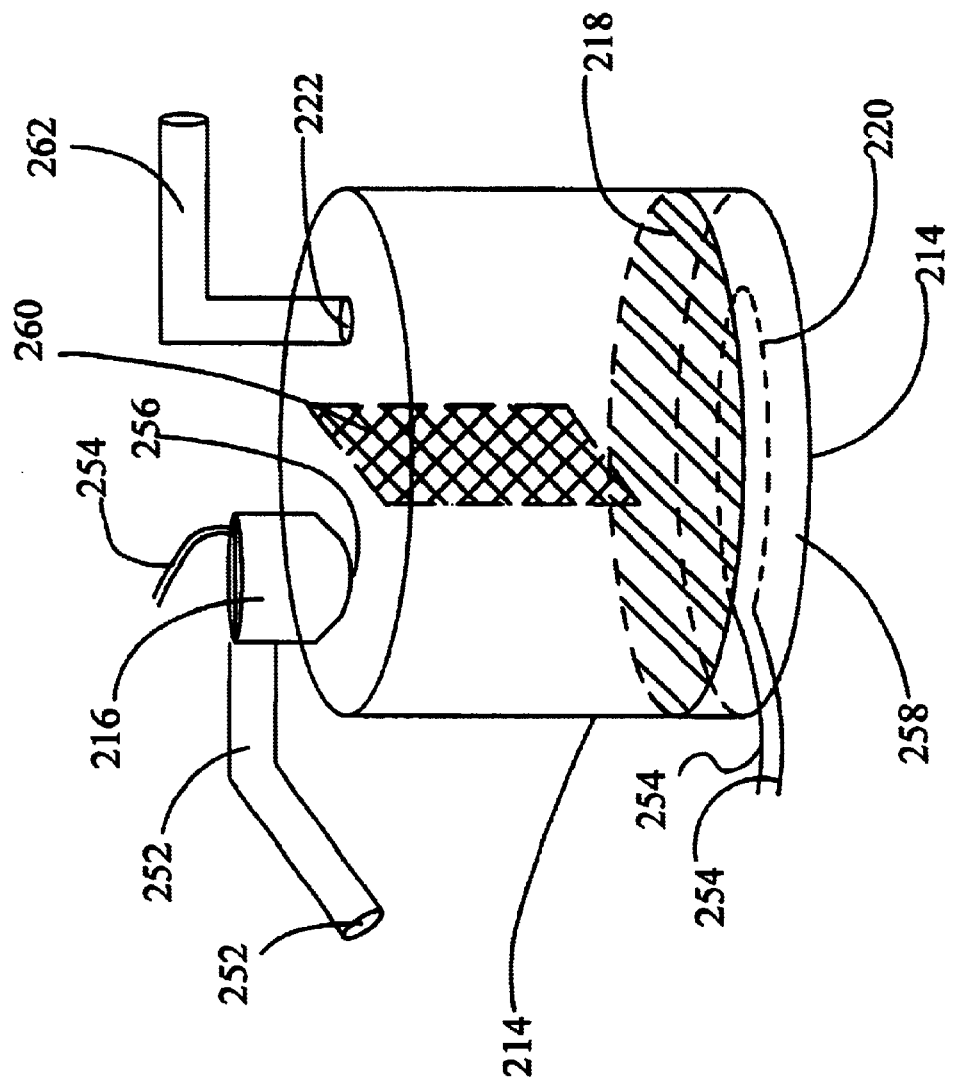
FIG. 3 illustrates a scorching chamber in accordance with the present invention.

FIG. 3 depicts an embodiment of a scorching chamber in accordance with the present invention. Raw water from a pressurized source or holding tank (not shown) flows through inlet pipe 252 and is discharged into scorching chamber 214 via electronic pulse valve 216 powered through leads 254. Pulse valve 216 may be any conventional electronically controlled valve or electronic pump. Raw water is sprayed intermittently or at a controlled constant state through nozzle 256 onto heated plate 218. Heated plate 218 is heated by heating element 220 from within insulated heater chamber 258 so that the raw water substantially vaporizes upon contact. Because the volume of vaporized water is much greater than the volume of the water from which the vapor was generated by boiling and evaporation at heated plate 218, significant vapor pressure is generated within scorching chamber 214. Accordingly, this results in driving substantially all vaporized water, in the form of steam through pipe 262. Thus, the vapor rises from heated plate 218 and exits chamber 214 through outlet 222 and connecting pipe 262. In this embodiment, chamber 214 further comprises baffle 260, which helps to prevent rising vapor from carrying water droplets into outlet 222. Baffle 260 may be lattice or a solid planar member. The exiting steam is then further heated before being exposed to the electrical field, or as in the previous embodiment, corona field 146.

The vapor then passes through corona field 146 where it is super heated. After superheating, vapor passes to condenser 30, where the same is condensed again into water in the liquid form which drips into collection tank 32, as noted above.

While illustrative embodiments of the invention have been described above, it is, of course, understood that various modifications will be apparent to those of ordinary skill in the art. Many such modifications are contemplated as being within the spirit and scope of the invention.

What is claimed is:

1. A water purification system comprising:
   a) a first water heating apparatus coupled to a water supply, said first water heating apparatus receiving water from said water supply, said first water heating apparatus comprising a first heat source sufficient to vaporize said received water substantially upon contact of the water with said first heat source; and
   b) a support structure coupled to said first water heating apparatus, said support structure receiving said vaporized water, said support structure comprising a second heat source;
   wherein said second heat source comprises a corona field generating an electrical field sufficient to superheat said water vapor to a temperature to combust organic contaminants.

2. A water purification system as in claim 1, wherein said support structure provides maximum exposure of said vaporized water with said second heat source.

3. A water purification system as in claim 1, wherein said support structure is constructed of inert material.

4. A water purification system as in claim 1, further comprising a condenser receiving said vaporized water.

5. A water purification system as in claim 1, wherein said water supply comprises a water inlet device, said water inlet device controlling the rate of entry of said water to said water heating device.

6. A water purification system as in claim 5, further comprising a water supply holding tank coupled to said water inlet device, said holding tank supplying water to said inlet device.

7. A water purification system as in claim 5, wherein said water inlet device is adjustable to control the location in which said water is discharged to within said water heating device.

8. A water purification system as in claim 1, wherein said electrical field is sufficient to combust aniline.

9. A water purification system as in claim 1, wherein said electrical field is sufficient to superheat said vaporized water to a temperature greater than 1500° F.

10. A water purification system as in claim 1, wherein said vaporized water is in direct contact with said second heat source.

11. A water purification system as in claim 1, wherein said water supply is a household or commercial water supply, municipal water supply, well water supply, rain water supply, or condensation collection water supply.

12. A water purification system as in claim 1, further comprising:
   (c) a condenser receiving said super-heated water vapor;
   (d) a second support structure, said second support structure receiving condensate from said condenser and storing said condensate for use as potable water; and
   (e) a housing, housing said first water heating apparatus, said support structure and said condenser, wherein said water purification system is a self supporting, standalone unit.

13. A water purification system as in claim 1, further comprising a temperature sensor coupled to said first water heating apparatus capable of stopping the flow of said water in response to the temperature of said first heating apparatus reaching a preset temperature.

14. A water purification system as in claim 13, wherein said preset temperature is 400° F.

15. A water purification system comprising:
   a) a first water heating apparatus coupled to a water supply, said first water heating apparatus receiving water from said water supply, said first water heating apparatus comprising a first heat source sufficient to vaporize said received water substantially upon contact of the water with said first heat source; and
   b) a support structure coupled to said first water heating apparatus, said support structure receiving said vaporized water, said support structure comprising a second heat source,
   wherein said second heat source comprises a pair of electrodes driven by a high-voltage source having a voltage in the range between 5000 and 12,000volts, said pair of electrodes generating an electrical field sufficient to superheat said water vapor to a temperature to combust organic contaminants.

16. A water purification system, comprising:
   a) a first water heating apparatus coupled to a water supply, said first water heating apparatus receiving water from said water supply, said first water heating apparatus comprising a first heat source sufficient to vaporize said received water substantially upon contact of the water with said first heat source, said first water heating apparatus comprising a water heating device to form vaporized water; and
   b) a support structure coupled to said first water heating apparatus, said support structure defining a chamber for receiving said vaporized water, said support structure comprising a second heat source, said chamber comprising lava block, said second heat source comprising an electrical field sufficient to superheat said water vapor to a temperature to combust organic contaminants.

* * * * *